United States Patent

Kurimoto et al.

[11] Patent Number: 5,713,611
[45] Date of Patent: Feb. 3, 1998

[54] CONNECTION OF A PLATE AND TUBULAR MEMBERS

[75] Inventors: Tooru Kurimoto, Nishikamo-gun; Hiroshi Nakamura, Ama-gun, both of Japan

[73] Assignee: Sango Co., Ltd., Nagoya, Japan

[21] Appl. No.: 707,219

[22] Filed: Sep. 3, 1996

[30] Foreign Application Priority Data

Sep. 13, 1995 [JP] Japan .................................. 7-260890

[51] Int. Cl.$^6$ .................................................. F16L 13/14
[52] U.S. Cl. .......................... 285/382.5; 285/222; 29/523; 29/890.044; 29/890.08
[58] Field of Search ............................. 285/222, 382.4, 285/382.5; 29/523, 890.044, 890.08, DIG. 43

[56] References Cited

U.S. PATENT DOCUMENTS

| | | | |
|---|---|---|---|
| 1,291,578 | 1/1919 | McPhail | 285/222 X |
| 2,460,580 | 2/1949 | Huber | 285/222 X |
| 3,248,791 | 5/1966 | Powers | 29/890.08 X |
| 3,885,298 | 5/1975 | Pogonowski | 285/382.4 X |
| 4,142,843 | 3/1979 | Kish | 285/382.4 X |
| 4,333,672 | 6/1982 | Arthur et al. | 285/382.2 |
| 4,334,703 | 6/1982 | Arthur et al. | 285/222 |

FOREIGN PATENT DOCUMENTS

| | | |
|---|---|---|
| Y2-54-31241 | 9/1979 | Japan . |
| B2-60-17615 | 5/1985 | Japan . |
| A-62-20990 | 1/1987 | Japan . |
| Y2-5-15534 | 4/1993 | Japan . |
| 2072554 | 10/1981 | United Kingdom ............ 29/890.044 |

*Primary Examiner*—John A. Ricci
*Attorney, Agent, or Firm*—Oliff & Berridge

[57] ABSTRACT

The invention is directed to a connection of a plate and a pair of tubular members. The plate has an aperture defined therein, and a tubular flange portion which is formed around the aperture and which extends away from a plane of the plate. A first opening end portion of a first tubular member is fitted onto an outer circumferential surface of the flange portion of the plate. And, a second opening end portion of a second tubular member is inserted into the flange portion, with a region of the second opening end portion axially remote from an end thereof pressed into contact with an inner circumferential surface of the flange portion. It is arranged that at least a part of an outer surface of the second opening end portion between the end of the second opening end portion and the region is pressed into contact with an inner surface of the first tubular member. An expanded portion may be formed between the region and the end of the second opening end portion to press the second tubular member into contact with the inner surface of the first tubular member.

16 Claims, 6 Drawing Sheets

CONNECTION OF A PLATE AND TUBULAR MEMBERS

BACKGROUND OF THE INVENTION

1. Field of the Invention

The present invention relates to a connection of a plate and tubular members, and more particularly to the connection having an air-tight sealing property, and to a method for forming such connection.

2. Description of the Related Arts

In general, a connection of a plate and a tube is made by welding the tube to the plate which has an aperture to receive the tube therein. As an alternative method for connecting the tube to the plate, a plurality of protrusions are formed in the side wall of the tube to hold the plate between the protrusions. Those connections have been used in the manufacture of a muffler or the like of an automobile, for example. In the U.S. Pat. No. 4,334,703, a tube-to-plate connection has been proposed, as well as a method and apparatus for forming the connection. According to the tube-to-plate connection disclosed in the U.S. Patent, a tube is connected to a plate about an aperture in the plate. The portion of the plate surrounding the aperture includes a flange which extends away from the plane of the plate. The wall of the tube which is connected to the plate lies within the flange. The flange and tube wall are staked radially to prevent movement of the tube longitudinally out of engagement with the plate and to prevent rotation of the tube relative to the plate.

Also, a method and apparatus for forming a tube-to-tube connection similar to the above-described tube-to-plate connection have been proposed in the U.S. Pat. No. 4,333,672. With respect to the tube-to-tube connection, Japanese Laid-open Publication No. 62-20990 discloses a method for forming an air-tight connection of a pair of pipes for supplying pressurized gas. This method includes the steps of sliding an end portion of one pipe into an end portion of the other pipe, then providing permanent set to at least a portion of the end of each pipe longitudinally and peripherally, by means of a device enclosing the ends of the pipes. The device has one or more stamps activated by oil pressure, hydraulic pressure or pneumatic pressure means to move radially.

In Japanese Utility-model Publication for Opposition No. 5-15534, a securing structure for a muffler is proposed to tightly secure an exhaust pipe to an end plate with a simple structure. According to the structure for inserting the exhaust pipe through the opposite end plates of a muffler in a vehicle exhaust system and securing the pipe to each end plate, the exhaust pipe is tightly secured to the end plate by forming a folded portion (i.e., burring portion ) around a whole peripheral portion of an aperture of the end plate, in parallel with the outer surface of the exhaust pipe, then inserting the exhaust pipe, expanding and pressing the whole outer circumference of the exhaust pipe into contact with the folded portion to provide air-tight sealing surfaces by the inner surface of the folded portion and the outer surface of the exhaust pipe, and elevating opposite sides of the portion of the exhaust pipe in contact with the folded portion thereby to form protrusions. Particularly, as its fourth embodiment, such a structure is disclosed in FIG. 9 that an inner pipe 24 is inserted into an exhaust outlet pipe 11 which has been inserted into a through hole 5ba of an end plate 5 in FIG. 9, and both of the pipes 11 and 24 are expanded simultaneously to press the outlet pipe 11 onto the folded portion 17 of the end plate 5b.

Also, Japanese Patent Publication for Opposition No. 60-17615 discloses a method and apparatus for securing air-tightly a metallic pipe and an end plate in a heat exchanging device or the like, wherein an end portion of a pipe is inserted into a through hole formed in an end plate, and the end portion of the pipe is expanded at both sides opposite to the end plate, and thereafter pressing the expanded portions to the peripheral portions opposite to the through hole with the force applied along the axis of the pipe. Furthermore, Japanese Utility-model Publication for Opposition No. 54-31241 discloses a muffler which includes an exhaust pipe and a housing both made of aluminium disposed steel plate, and which is formed as one body by inserting the exhaust pipe into the housing. In practice, a front body of the housing is fitted onto the exhaust pipe from the front end of the exhaust pipe, and the front body is pressed until its through hole portion contacts with a stopper portion which was formed by expanding the exhaust pipe wall.

According to the tube-to-plate connection as disclosed in the U.S. Pat. No. 4,334,703, it is difficult to ensure a sufficient air-tight sealing property, so that the tube-to-plate connection can not be applied to a connection of the end plate and an inlet pipe, or a connection of the end plate and an outlet pipe. Therefore, it is described in the U.S. Patent that those connections are to be made by welding. In the Japanese Laid-open Publication No. 62-20990, it is proposed to ensure the air-tight sealing property with respect to the tube-to-tube connection, but this connection can not necessarily be applied to the tube-to-plate connection as well.

In order to ensure the air-tight sealing property in the connection as disclosed in the Japanese Utility-model Publication for Opposition No. 5-15534, it is necessary to expand and press the exhaust pipe uniformly and firmly around its whole circumference. In that Publication, it is disclosed that eight expanding segments have been used for expanding the pipe once at an original position, then rotating them 1/16 turn about the axis of the pipe, i.e., a rotational angle of 22.5° at the same longitudinal position as the original position, and then expanding the pipe again. Therefore, this method will cause increase in working time. In addition, since it is difficult to enlarge a difference in diameter between the expanding portion and the protrusions, if an excessive load is applied in the axial direction of the pipe after the connection was made, the burring portion might ride over the protrusions. Furthermore, if a moment was applied to the pipe in such a direction to bend the pipe about a sealed portion, it might cause deformation of the sealed portion to deteriorate the air-tight sealing property. According to the connection disclosed in that Publication, therefore, it is difficult to ensure a sufficient strength against the load applied to the exhaust pipe, and also difficult to maintain the air-tight sealing property. Although FIG. 9 of the Publication discloses the fourth embodiment in which a pair of pipes are connected together, those pipes must be pressed onto the folded portion simultaneously to be expanded uniformly and firmly around the whole circumference, so that it is difficult to connect them, and also difficult to ensure the air-tight sealing property.

With respect to the tube-to-plate connection as disclosed in the Publication No. 60-17615, it is so arranged that the opening end of the metallic pipe is pressed to the opposite ends of the through hole in the end plate. Therefore, this can not be applied to such a structure that the tubular member penetrates the plate. Although it has been so arranged that the exhaust pipe is inserted into the through hole of the housing in the Publication No. 54-31241, it is difficult to ensure a sufficient connecting strength by simply pressing the pipe into contact with the through hole of the housing.

SUMMARY OF THE INVENTION

Accordingly, it is an object of the present invention to provide a connection of a plate and a pair of tubular members having a stable air-tight sealing property.

It is another object of the present invention to provide a connection of a plate and a pair of tubular members which includes a portion for providing mainly a sufficient connecting strength between the plate and the tubes, and a portion for providing mainly a stable air-tight sealing property, with both portions assisting each other.

It is a further object of the present invention to provide a method for forming a connection of a plate and a pair of tubular members having a stable air-tight sealing property.

In accomplishing the above and other objects, a connection of a plate and a pair of tubular members is formed as follows. The plate has an aperture defined therein, and a tubular flange portion which is formed around the aperture and which extends away from a plane of the plate. A first opening end portion of a first tubular member is fitted onto an outer circumferential surface of the flange portion of the plate, and a second opening end portion of a second tubular member is inserted into the flange portion, with a certain region of the second opening end portion axially remote from an end thereof pressed into contact with an inner circumferential surface of the flange portion. At least a part of an outer surface of the second opening end portion between the end of the second opening end portion and the region is pressed into contact with an inner surface of the first tubular member.

In the above-described connection, it is preferable that the first tubular member has a flared portion expanded radially outwardly at an end of the first opening end portion, and that the first tubular member is fitted onto the flange portion, with the flared portion abutting on the plane of the plate.

In the above-described connection, it is preferable that the second tubular member has a tapered portion at a side of the region axially remote from the end of the second opening end portion, and that the second tubular member is inserted into the flange portion to such an extent that the tapered portion abuts on a peripheral portion around the aperture of the plate.

Preferably, the connection may further include an expanded portion formed between the region and the end of the second opening end portion to press the second tubular member into contact with the inner surface of the first tubular member.

A method may be provided for forming a connection of a plate and tubular members and including the steps of (1) providing a plate having an aperture defined therein, and having a tubular flange portion formed around the aperture and extending away from a plane of said plate, (2) providing a first tubular member having a first opening end portion and having a flared portion expanded radially outwardly at an end of the first opening end portion, (3) fitting the first opening end portion of the first tubular member onto an outer circumferential surface of the flange portion of the plate, with the flared portion abutting on the plane of the plate, (4) providing a second tubular member having a second opening end portion and having a tapered portion formed on the second tubular member at a position axially remote from the end of the second opening end portion by a certain distance, (5) inserting the second tubular member into the flange portion to press the second opening end portion into contact with an inner circumferential surface of the flange portion from the plane opposite to the plane from which the flange portion extends, to such an extent that the tapered portion abuts on a peripheral portion around the aperture of the plate, and that the end of the second opening end portion extends through the flange portion into the inside of the first tubular member to provide a certain region of the second opening end portion axially remote from the end thereof, and (6) pressing the region of the second opening end portion toward the flange portion to expand at least a part of an outer surface of the second opening end portion into contact with an inner surface of the first tubular member corresponding to the region.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
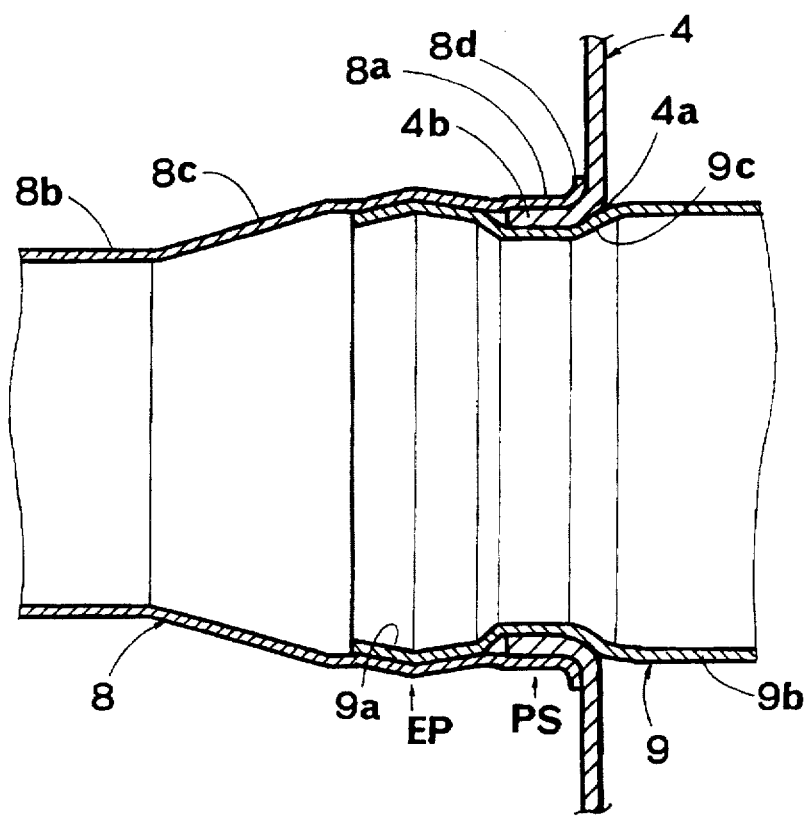
FIG. 1 is a fragmentary sectional view of a guide tube, an outlet tube and an end plate connected together according to an embodiment of the present invention.
Figure 2:
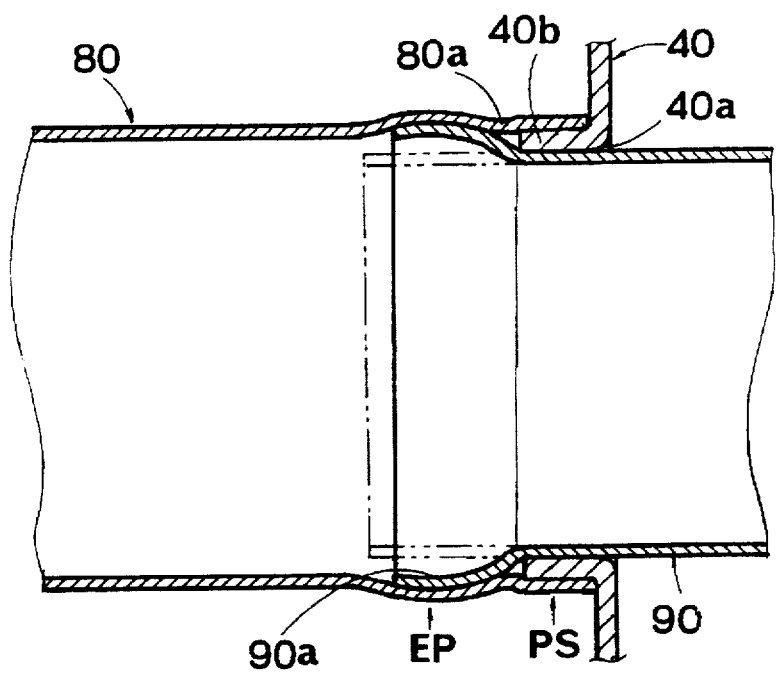
FIG. 2 is a fragmentary sectional view of a plate and a pair of tubes connected together according to another embodiment of the present invention.
Figure 10:
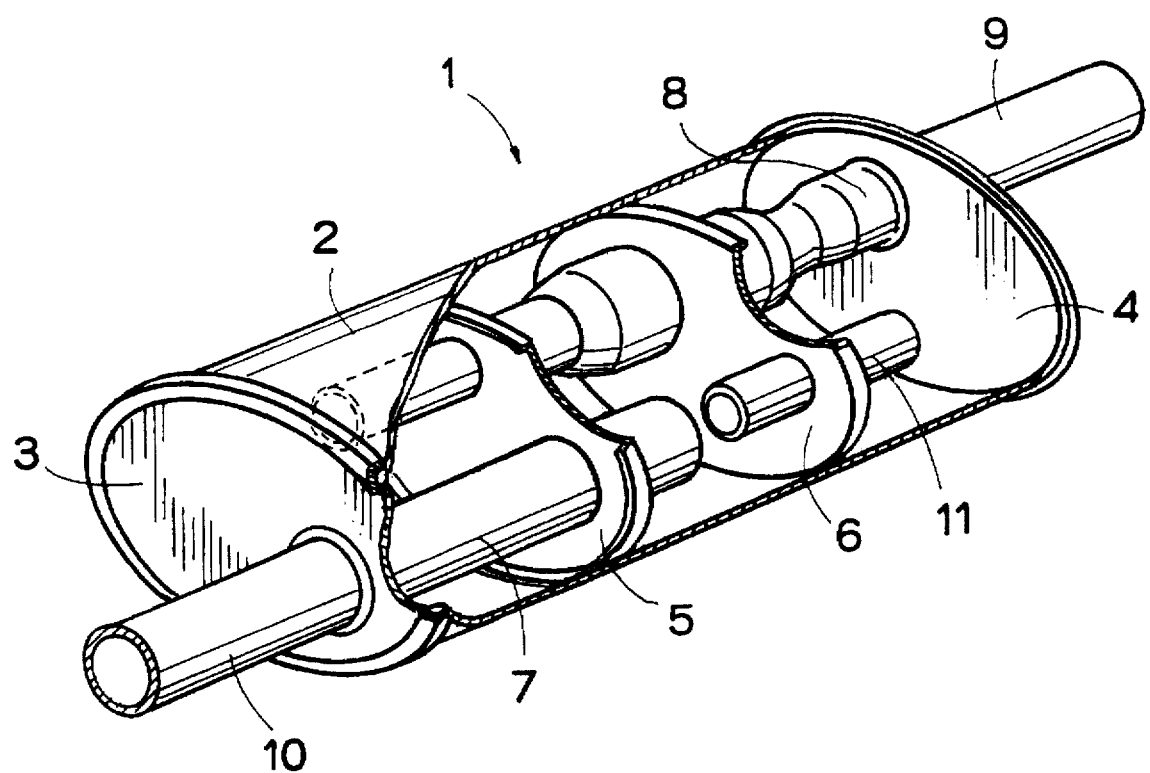
FIG. 10 is a partially sectioned perspective view of a muffler including a connection of a plate and a pair of tubes according to an embodiment of the present invention.

Referring to FIGS. 2 and 3, there is generally illustrated a connection of a plate and a pair of tubular members and the steps of connecting them according to an embodiment of the present invention. The connection arrangement is applicable to a muffler 1 of an automobile as shown in FIG. 10 for example, more particularly to a connection of an end plate 4, a guide tube 8 and an outlet tube 9 (or, a connection between an end plate 3, a guide tube 7 and an inlet tube 10), to provide a connection as shown in FIG. 1.

FIG. 2 illustrates a connection of a plate 40, a first tubular member 80 and a second tubular member 90. A through hole or an aperture 40a is formed in the plate 40, and a cylindrical flange 40b extends from a plane of the plate 40 around the aperture 40a. The first tubular member 80 has a first opening end portion 80a which is fitted onto an outer circumferential surface of the flange 40b. The second tubular member 90 has a second opening end portion 90a which is inserted into the flange 40b from the opposite side to the plane of the plane 40 from which the flange 40b extends, with the opening end portion 90a pressed into contact with an inner circumferential surface of the flange 40b. As a result, a press fitting portion PS is formed around the flange 40b, with its outer circumferential surface and its inner circumferential surface pressed into contact with the first tubular member 80 and the second tubular member 90, respectively. Therefore, a certain region of the second tubular member 90 axially remote from an end of the opening end portion 90a is secured to the inner surface of the flange 40b, and also the outer surface of the opening end portion 90a between its end and the region is pressed into contact with the inner surface of the first tubular member 80. In FIG. 2, the opening end portion 90a of the second tubular member 90 is expanded together with the first tubular member 80 to provide an expanded fitting portion EP.

Figure 3A:
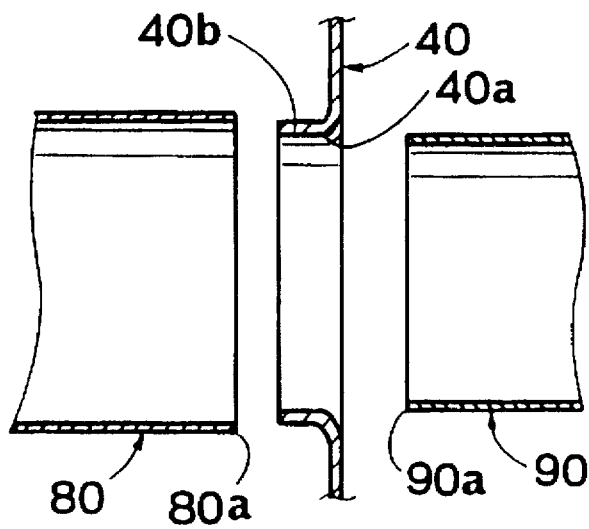
FIGS. 3(A)-3(C) are sectional views showing the steps of connecting a plate and a pair of tubes according to another embodiment of the present invention.

FIG. 3 illustrates a method for connecting the plate 40, the first tubular member 80 and the second tubular member 90 together, according to the embodiment for forming the connection as shown in FIG. 2. At the outset, the aperture 40a is defined in the plate 40, forming the flange 40b around the aperture 40a by burring means for example, thereby to form the plate 40 as shown in FIG. 3(A). Then, the opening end portion 80a of the first tubular member 80 is fitted onto the outer surface of the flange 40b. In this embodiment, the inner diameter of the first tubular member 80 is formed slightly larger than the outer diameter of the flange 40b. The first tubular member 80 is fitted onto the aperture 40a and pressed until an end of the opening end portion 80a abuts on the plane of the plate 40, so that the first tubular member 80 and the flange 40b are overlapped.

Figure 3B:
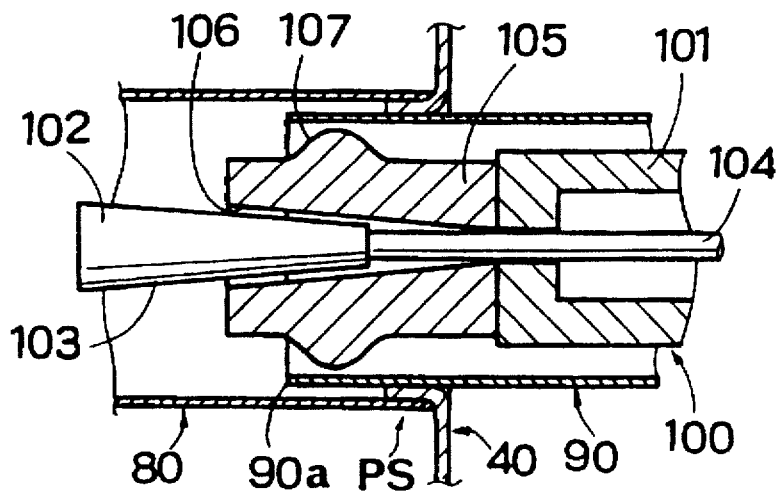

Next, the opening end portion 90a of the second tubular member 90 is inserted into the flange 40b, with the opening end portion 90a pressed into contact with the inner circumferential surface of the flange 40b. The outer diameter of the second tubular member 90 is formed slightly larger than the inner diameter of the flange 40b. The second tubular member 90 is inserted through the aperture 40a into the inside of the first tubular member 80 to such an extent that an end of the opening end portion 90a extends through an end of the flange 40b into a certain position in the first tubular member 80, so that three members of the first tubular member 80, the flange 40b and the second tubular member 90 are overlapped to contact one another, thereby to form the press fitting portion PS, as shown in FIG. 3(B) and indicated by a phantom line in FIG. 2. These fitting and pressing steps may be made by a single step automatically. In this case, however, it is necessary to insert the second tubular member 90 into the flange 40b after the first tubular member 80 has been fitted onto the flange 40b.

Then, a forming device 100 is inserted into the second tubular member 90, as shown in FIG. 3(B). The forming device 100 has a holding member 101 and a plurality of dies 105 held by the holding member 101, through which a movable element 102 and a shaft 104 are axially slidably inserted. The movable element 102 has a conical side surface 103, which mates with an inner conical surface 106 of a hollow portion which is axially formed in the center of the dies 105. The dies 105 are peripherally divided into 4-6 dies by radially extending surfaces in a circumferential direction, with each base held by the holding member 101, and urged to form such a contour as shown in FIG. 3(B). The dies 105 have annular protrusions 107 on their outer circumferential surfaces, respectively, to form a ring having a semicircular cross-section around the dies 105.

Figure 3C:
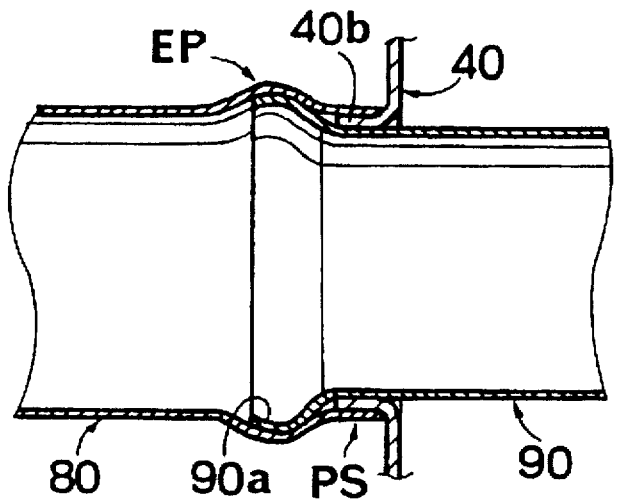

The forming device 100 is placed at a position where the protrusions 107 are placed to face the inner surface of the opening end portion 90a which is not overlapped with the the flange 40b in the first tubular member 80 as shown in FIG. 3(B). Then, the movable element 102 is moved in the right direction in FIG. 3(B) through the shaft 104 by means of a hydraulic apparatus (not shown) or the like, so that the dies 105 are uniformly radially moved outward to press the protrusions 107 into contact with the inner surface of the second tubular member 90. With further movement of the movable element 102 in the right direction, the second tubular member 90 is expanded radially and pressed into contact with the inner surface of the first tubular member 80. With yet further movement of the movable element 102 in the right direction, the first tubular member 80 is also expanded radially, so that the first tubular member 80 and second tubular member 90 are deformed into such a contour as shown in FIG. 3(C) thereby to form the expanded portion EP. Thereafter, when the movable element 102 is moved in the left direction in FIG. 3(B), the dies 105 are moved to form the original contour as shown in FIG. 3(B), so that the forming device 100 can be removed from the inside of the first tubular member 80 and second tubular member 90. Thus, a single expanding step by means of the forming device 100 is sufficient, because the air-tight sealing property is ensured by the press fitting portion PS, as described later in detail. Further, the steps of inserting the second tubular member 90 into the aperture 40a and then expanding the first tubular member 80 and second tubular member 90 can be made by a single step with the first tubular member 80 installed on the forming device 100 in advance.

Accordingly, the connection as shown in FIGS. 2 or 3(C) is completed to firmly connect the first tubular member 80 and second tubular member 90 together in a relatively wide region, thereby to provide an air-tight sealing property mainly at the press fitting portion PS, and provide a connecting strength mainly at the expanded portion EP, with both portions assisting each other, so that sufficient connecting strength and stable air-tight property can be made. Even if a bending moment was caused between the first tubular member 80 and the second tubular member 90, the air-tight sealing property at the press fitting portion PS would not be deteriorated, and the connecting strength between the first tubular member 80 and second tubular member 90 could be maintained at the expanded portion EP. The above-described connection of the plate and the tubular members is suited for use in a muffler of an automobile, as explained in the following embodiments.

Figure 4:
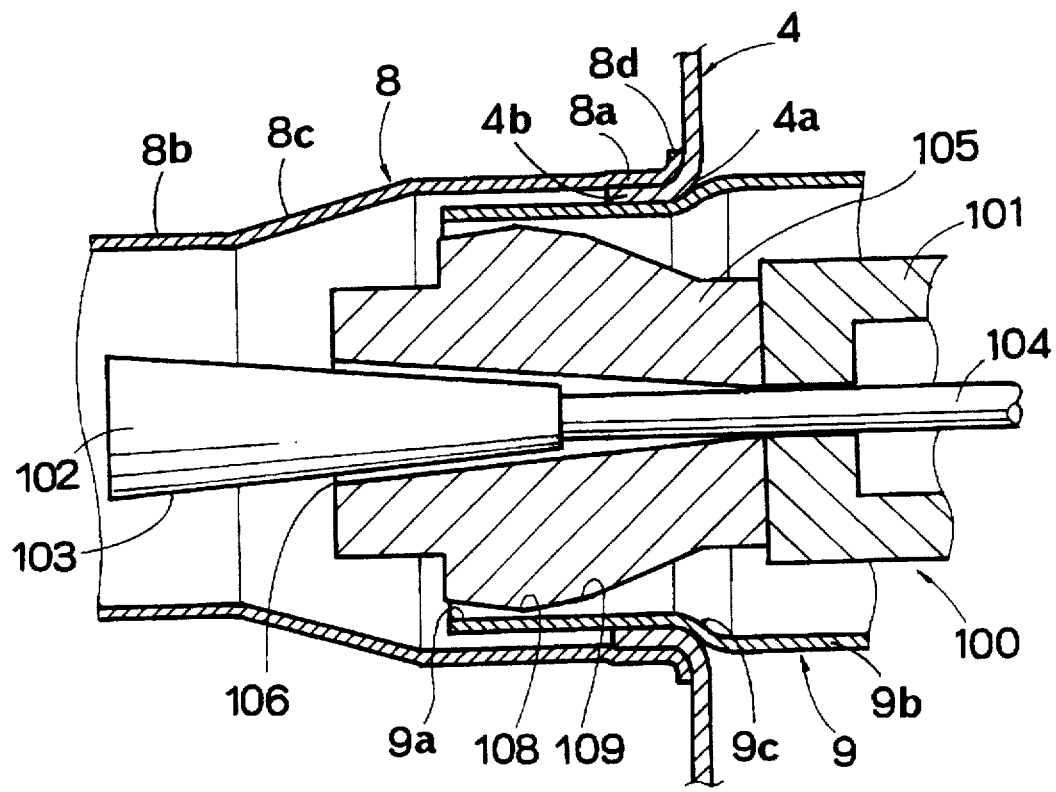
FIG. 4 is a fragmentary sectional view of a guide tube, an outlet tube and an end plate, when they are connected together, according to the embodiment as shown in FIG. 1.

FIG. 10 illustrates an embodiment of the muffler which includes a cylindrical shell 2 having a circular cross-section or an oval cross-section, a pair of end plates 3, 4 for closing opposite ends of the shell 2, an outlet tube 9 which is connected to the end plate 4, and an inlet tube 10 which is connected to the end plate 3. The shell 2 has a plurality of rooms defined by baffle plates 5 and 6 for example, on which a guide tube 7, a guide tube 8, a connecting tube 11 and etc. are mounted. These are made of metal. The guide tube 8 is connected to the outlet tube 9, the guide tube 7 is connected to the inlet tube 10. FIG. 1 illustrates the connection of the guide tube 8, the outlet tube 9, and the end plate 4, and FIG. 4 illustrates those before the guide tube 8 and outlet tube 9 are expanded. In FIGS. 1 and 4, structural elements equivalent to those described in FIGS. 2 and 3 will be designated by corresponding reference numerals with "0" following them.

Referring to FIG. 4, a method for connecting the guide tube 8 and outlet tube 9 to the end plate 4 will be explained as follows: At the outset, an aperture 4a is defined in the end plate 4, forming a flange 4b around the aperture 4a by the burring means. The guide tube 8 is different in configuration from the first tubular member 80 as shown in FIG. 2, a part of the guide tube 8 is reduced in diameter (e.g., by 10%) to form a small diameter portion 8b, or an opening end portion 8a is relatively increased in diameter, so that the guide tube 8 is formed in such a configuration as the opening end portion 8a and the small diameter portion 8b are connected through a tapered portion 8c. The guide tube 8 also has a flared portion 8d which is expanded radially outwardly to form a circumferential collar at its one end. As means for reducing the diameter of the guide tube 8, any working means may be employed, such as constricting means, squeezing means, etc. Also, the outlet tube 9 is relatively reduced in diameter at an opening end portion 9a to form a large diameter portion 9b, so that a tapered portion 9c is formed between them. Normally, the inner diameter of the opening end portion 8a of the guide tube 8 is formed slightly larger than the outer diameter of the flange 4b, while the outer diameter of the opening end portion 9a of the outlet tube 9 is formed slightly larger than the inner diameter of the flange 4b.

Then, the opening end portion 8a of the guide tube 8 is fitted onto the outer surface of the flange 4b, and pressed until an end of the opening end portion 8a abuts on the plane of the end plate 4. And, the opening end portion 9a of the outlet tube 9 is inserted into the flange 4b, with the opening end portion 9a pressed into contact with the inner circumferential surface of the flange 4b, and inserted through the aperture 4a into the inside of the guide tube 8 until the tapered portion 9c abuts on a peripheral portion of the aperture 4a, so that the guide tube 8, the end plate 4 and the outlet tube 9 are overlapped to contact one another. In this case, it is preferable that the dimensions of the guide tube 8 and outlet tube 9 are set so as to slightly expand the overlapped portion of the guide tube 8 and the flange 4b, when the outlet tube 9 is inserted into the guide tube 8. According to the present embodiment, the outlet tube 9 is press fitted into the flange 4b with the flared portion 8d abutting on the plane of the end plate 4, so that a load which is applied to the end plate 4 by a resisting force, which is caused when the outlet tube 9 is press fitted into the flange 4b, is sustained at the flared portion 8d, thereby to prevent the deformation of the end plate 4.

Figure 5:
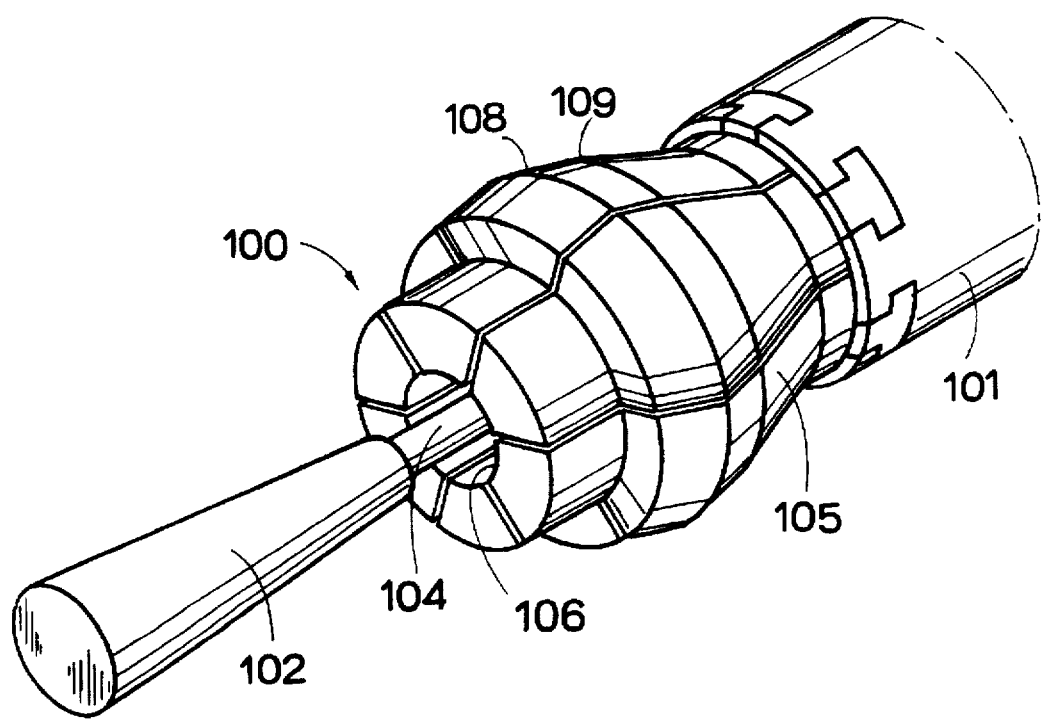
FIG. 5 is a perspective view of a forming device for use in an embodiment of the present invention.

Next, the forming device 100 as shown in FIG. 5 is inserted into the guide tube 8 and outlet tube 9, and placed as shown in FIG. 4. The forming device 100 has circumferential protrusions 108 and 109, each having a pair of gradually inclined surfaces (5°–15°) mating with each other along its circumference, which are different in configuration from the protrusion 107 in FIG. 3. The remaining structure is substantially the same as the structure of the forming device 100 as shown in FIG. 3, so that the same reference numerals are used for the same elements as those in FIG. 3. When the movable element 102 is moved in the right direction in FIG. 4, the dies 105 are uniformly radially moved outward to press the protrusions 108, 109 into contact with the inner surface of the outlet tube 9. With further movement of the movable element 102 in the right direction, the outlet tube 9 is expanded radially and pressed into contact with the inner surface of the guide tube 8, so that the guide tube 8 and outlet tube 9 are deformed into such a contour as shown in FIG. 1. After the guide tube 8 and outlet tube 9 have been deformed, the movable element 102 is moved in the left direction in FIG. 1, the dies 105 are moved to form the original contour as shown in FIG. 1, so that the forming device 100 can be removed from the inside of the guide tube 8 and outlet tube 9. As described above, a single expanding step is sufficient, and the dies 105 can be made by smaller number of dies as shown in FIG. 5 than the prior dies, thereby to reduce in cost.

According to the connection in the muffler 1 of the present embodiment, therefore, the outer and inner surfaces of the flange 4b of the end plate 4 are firmly connected to the guide tube 8 and the outlet tube 9, respectively, by inserting the outlet tube 9 into the flange 4b, with an air-tight sealing property provided mainly at the press fitting portion PS, and with a sufficient connecting strength provided mainly at the expanded portion EP. Also, it is so arranged that those portions PS and EP assist each other. Therefore, they are firmly connected to one another in such a wide region as extending approximately 30 mm of the portions PS and EP. That is, the connecting strength (stiffness of connection) is mainly ensured by the expanded portion EP with the press fitting portion PS assisted, while the air-tight sealing property is mainly ensured by the press fitting portion PS with the expanded portion EP assisted. Accordingly, a stable air-tight sealing property could be ensured by the press fitting portion PS, even if it became difficult to obtain the sufficient air-tight sealing property by the press fitting portion PS due to simplifying the forming device 100, or simplifying the expanding step. In other words, since the air-tight sealing property is to be ensured by the press fitting portion PS, the length and diameter of the expanded portion EP can be set appropriately irrespective of the sealing property to adjust the connecting strength. On the contrary, the connecting strength is ensured mainly by the expanded portion EP, so that the air-tight sealing property at the press fitting portion PS would not be deteriorated, even if a force was applied to cause a bending moment of the guide tube 8 against the outlet tube 9.

According to the embodiment as shown in FIG. 1, it is so arranged that the flared portion 8d abuts on the end plate 4, thereby to assist the portions PS, EP in ensuring the connecting strength and the air-tight sealing property. Furthermore, it is so arranged that the outlet tube 9 is connected to the end plate 4 with the tapered portion 9c seated on the peripheral portion of the aperture 4a, thereby to assist in ensuring the air-tight sealing property. According to the present embodiment, the guide tube 8 has the small diameter portion 8b and etc., and also the outlet tube 9 has the large diameter portion 9b and etc. These portions are arranged to gradually increase the diameters of the sections of the muffler in a direction of gas flow, as the gas flows through the tapered portion 8c, the press fitting portion PS, and then the large diameter portion 9b. Therefore, not only air resistance in the passage can be reduced to minimize the resistance against the gas flow, but also such a recent requirement as to enlarge the diameter of the opening end portion 9a can be met. Since the press fitting portion PS and the expanded portion EP do not extend outside of the end plate 4, the outside view of the muffler will not be deteriorated, and the end portion of the outlet tube 9 extending out of the end plate 4 can be freely formed.

Figure 6:
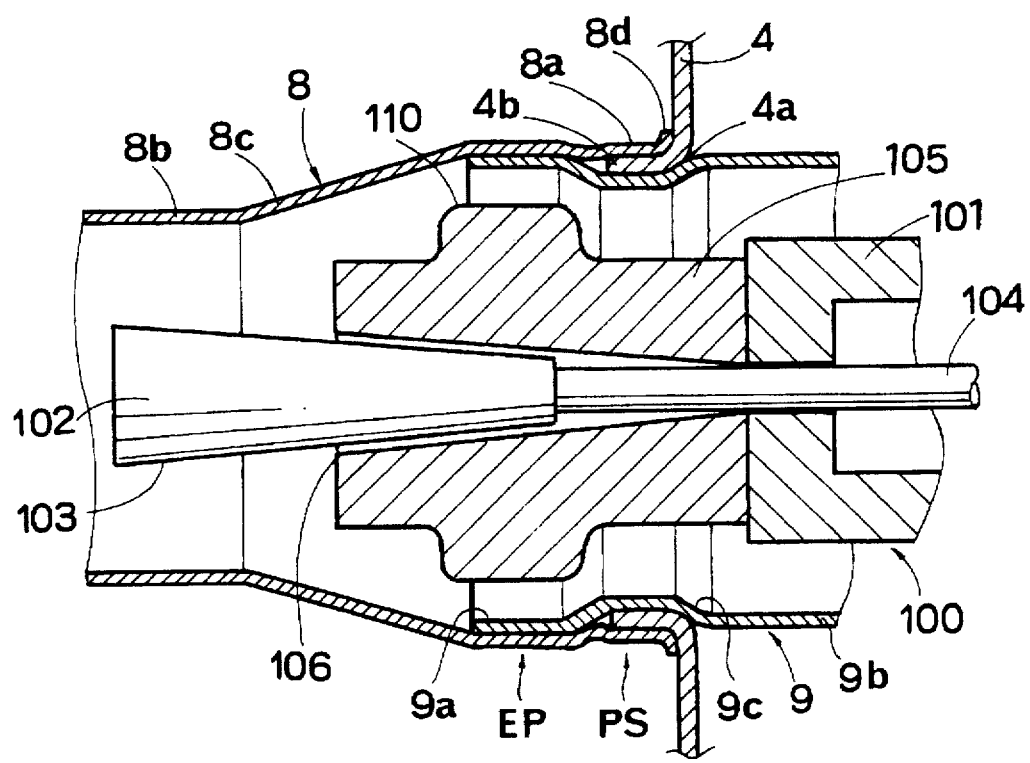
FIG. 6 is a fragmentary sectional view of a guide tube, an outlet tube and an end plate, when they are connected together, according to a further embodiment of the present invention.

FIG. 6 illustrates a further embodiment of the present invention, which is different from the embodiments as shown in FIGS. 4 and 5 with respect to the contour of the dies 105, so that the configuration of the overlapped portion of the guide tube 8 and the outlet tube 9 is different from that in FIGS. 4 and 5. That is, the cross-section of each protrusion 110 of the dies 105 is formed to be rectangular, so as to provide an axially flat top surface around the protrusions 110. Therefore, the outer circumferential surface around the expanded portion EP of the guide tube 8 and the outlet tube 9 are formed axially flat, as shown in FIG. 6. The rest of the structure in FIG. 6 is substantially the same as those in FIGS. 4 and 5.

Figure 7:
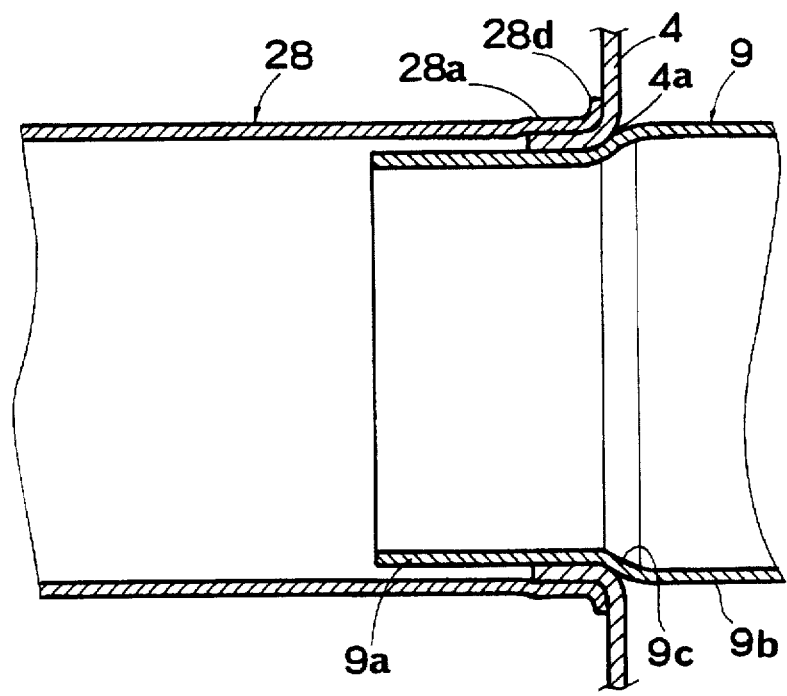
FIG. 7 is a fragmentary sectional view of a guide tube, an outlet tube and an end plate connected together before the expanding step is made according to a further embodiment of the present invention.
Figure 8:
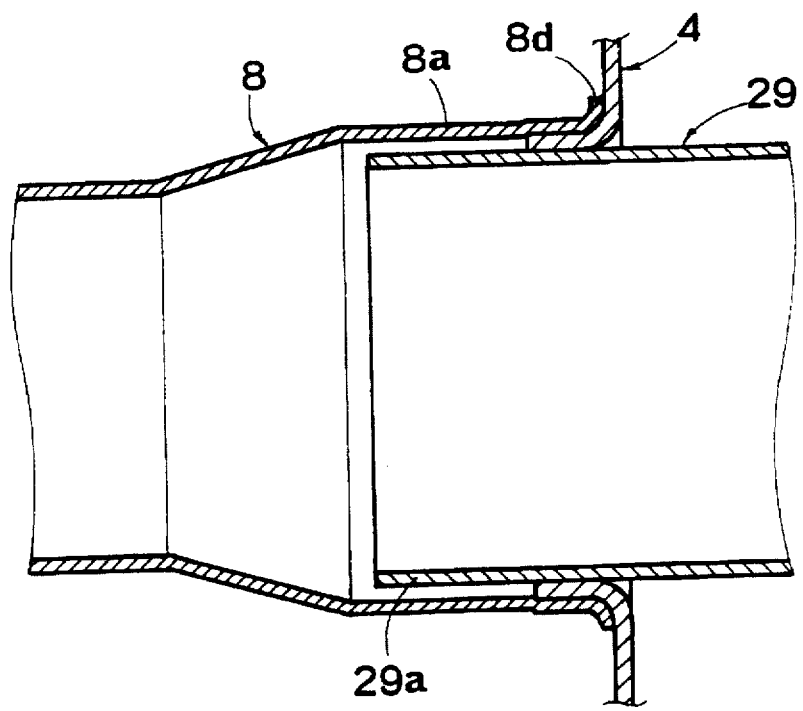
FIG. 8 is a fragmentary sectional view of a guide tube, an outlet tube and an end plate connected together before the expanding step is made according to a further embodiment of the present invention.
Figure 9:
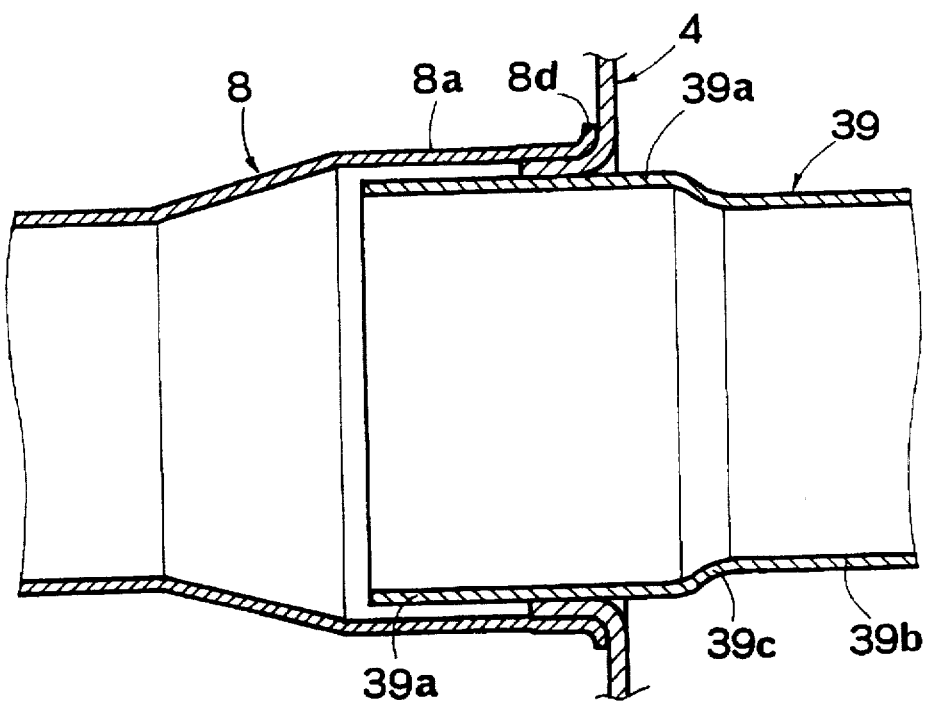
FIG. 9 is a fragmentary sectional view of a guide tube, an outlet tube and an end plate connected together before the expanding step is made according to a yet further embodiment of the present invention.

FIGS. 7–9 illustrate further embodiments of the present invention, which are different from the previous embodiments with respect to the configuration of the guide tube 8 or the outlet tube 9 before they are finally connected together. In FIGS. 7–9, the elements equivalent to the guide tube 8 and outlet tube 9 will be designated by corresponding reference numerals with different ten-series numerals preceding them. In the embodiment as shown in FIG. 7, the small diameter portion 8b and tapered portion 8c as shown in the previous figures are not formed on a guide tube 28, but only a flared portion 28d is formed thereon. According to the embodiment as shown in FIG. 8, an outlet tube 29 is a cylindrical tube of a uniform diameter, so that the large diameter portion 9b and the tapered portion 9c as shown in FIG. 4 are not formed in FIG. 8. In the embodiment as shown in FIG. 9, an outlet tube 39 has an opening end portion 39a of a relatively large diameter, a relatively small diameter portion 39b, and a tapered portion 39c connecting them. With respect to the guide tubes 8, 28 as shown in FIGS. 7–9, the flared portions 8d, 28d may be deleted to place open ends of the guide tubes 8, 28 into contact with the end plate 4, respectively. As exemplified heretofore, the guide tube 8 and etc., and the outlet tube 9 and etc. may be formed in various fashions. Various combinations of those configurations may be made. The connections between the baffle plates 5, 6 and the guide tube 7, the guide tube 8 or the connecting tube 11 may be made in the same manner as the above described connections.

It should be apparent to one skilled in the art that the above-described embodiment are merely illustrative of but a few of the many possible specific embodiment of the present invention. Numerous and various other arrangements can be readily devised by those skilled in the art without departing from the spirit and scope of the invention as defined in the following claims.

What is claimed is:

1. A connection of a plate and tubular members, comprising:
   a plate having an aperture defined therein, and a tubular flange portion formed around the aperture and extending away from a plane of said plate;
   a first tubular member having a first opening end portion fitted onto an outer circumferential surface of said flange portion of said plate, and
   a second tubular member having a second opening end portion inserted into said flange portion, with a certain region of said second opening end portion axially remote from an end thereof pressed into contact with an inner circumferential surface of said flange portion, at least a part of an outer surface of said second opening end portion between the end of said second opening end portion and said region being pressed into contact with an inner surface of said first tubular member.

2. The connection as claimed in claim 1, wherein said first tubular member has a flared portion expanded radially outwardly at an end of said first opening end portion, and wherein said first tubular member is fitted onto said flange portion, with said flared portion abutting on the plane of said plate.

3. The connection as claimed in claim 2, wherein an expanded portion is formed between the end of said second opening end portion and an end of said flange for pressing said second tubular member into contact with the inner surface of said first tubular member.

4. The connection as claimed in claim 1, wherein said second tubular member has a tapered portion at a side of said region axially remote from the end of said second opening end portion, and wherein said second tubular member is inserted into said flange portion to such an extent that said tapered portion abuts on a peripheral portion around said aperture of said plate.

5. The connection as claimed in claim 4, wherein an expanded portion is formed between the end of said second opening end portion and an end of said flange for pressing said second tubular member into contact with the inner surface of said first tubular member.

6. The connection as claimed in claim 5, wherein said first tubular member has a flared portion expanded radially outwardly at an end of said first opening end portion, and wherein said first tubular member is fitted onto said flange portion, with said flared portion abutting on the plane of said plate.

7. The connection as claimed in claim 1, further comprising an expanded portion formed between said region and the end of said second opening end portion to press said second tubular member into contact with the inner surface of said first tubular member.

8. The connection as claimed in claim 7, wherein said first tubular member has a circumferential protrusion formed on an outer surface of said first tubular member corresponding to said expanded portion of said second tubular member.

9. The connection as claimed in claim 8, wherein said circumferential protrusion has a configuration of a pair of gradually inclined surfaces mating with each other along a circumference of said first tubular member.

10. The connection as claimed in claim 8, wherein said circumferential protrusion has a configuration of an axially flat top surface.

11. A method for forming a connection of a plate and tubular members comprising the steps of:
   providing a plate having an aperture defined therein, and having a tubular flange portion formed around the aperture and extending away from a plane of said plate;
   fitting a first tubular member having a first opening end portion onto an outer circumferential surface of said flange portion of said plate;
   inserting a second tubular member having a second opening end portion into said flange portion to press said second opening end portion into contact with an inner circumferential surface of said flange portion from the plane opposite to the plane from which said flange portion extends, to such an extent that the end of said second opening end portion extends through said flange portion into the inside of said first tubular member to provide a certain region of said second opening end portion axially remote from the end thereof; and
   pressing said region of said second opening end portion toward said flange portion to expand at least a part of an outer surface of said second opening end portion into contact with an inner surface of said first tubular member corresponding to said region.

12. The method as claimed in claim 11 including the step of forming a flared portion expanded radially outwardly at an end of said first opening end portion, and wherein said first tubular member is fitted onto said flange portion, with said flared portion abutting on the plane of said plate.

13. The method as claimed in claim 11 including the step of forming a tapered portion on said second tubular member at a side of said region axially remote from the end of said second opening end portion, and wherein said second tubular member is inserted into said flange portion to such an extent that said tapered portion abuts on a peripheral portion around said aperture of said plate.

14. The method as claimed in claim 11 including the step of forming an expanded portion between said region and the end of said second opening end portion to press said second tubular member into contact with the inner surface of said first tubular member.

15. The method as claimed in claim 14 including the step of forming a circumferential protrusion formed on an outer surface of said first tubular member corresponding to said expanded portion of said second tubular member.

16. A method for forming a connection of a plate and tubular members comprising the steps of:

providing a plate having an aperture defined therein, and having a tubular flange portion formed around the aperture and extending away from a plane of said plate;

providing a first tubular member having a first opening end portion and having a flared portion expanded radially outwardly at an end of said first opening end portion;

fitting said first opening end portion of said first tubular member onto an outer circumferential surface of said flange portion of said plate, with said flared portion abutting on the plane of said plate;

providing a second tubular member having a second opening end portion and having a tapered portion turned on said second said second tubular member at a position axially remote from the end of said second opening end portion by a certain distance;

inserting said second tubular member into said flange portion to press said second opening end portion into contact with an inner circumferential surface of said flange portion from the plane opposite to the plane from which said flange portion extends, to such an extent that said tapered portion abuts on a peripheral portion around said aperture of said plate, and that the end of said second opening end portion extends through said flange portion into the inside of said first tubular member to provide a certain region of said second opening end portion axially remote from the end thereof; and pressing said region of said second opening end portion toward said flange portion to expand at least a part of an outer surface of said second opening end portion into contact with an inner surface of said first tubular member corresponding to said region.

* * * * *